April 1, 1969   E. W. REISSNER   3,436,290
METHOD OF MAKING SHEET MATERIALS OF DESIRED SIZE
FROM SMALLER SHEETS JOINED TOGETHER
Filed June 18, 1965

United States Patent Office 3,436,290
Patented Apr. 1, 1969

3,436,290
METHOD OF MAKING SHEET MATERIALS OF DESIRED SIZE FROM SMALLER SHEETS JOINED
Edgar Wilhelm Reissner, Lydney, England, assignor to Factories Direction Limited, Lydney, England
Filed June 18, 1965, Ser. No. 464,948
Int. Cl. B27d 5/00
U.S. Cl. 156—193          4 Claims

ABSTRACT OF THE DISCLOSURE

The invention relates to the manufacture of sheet materials, such as veneers, by joining relatively small sheets of the material together so as to produce sheets of a required size. The said relatively small sheets are joined together end to end, preferably by means of an adhesive paper tape, to form a continuous strip. The continuous strip is bound helically onto a body and helical coils are joined together, preferably by another adhesive paper tape, to form a hollow shell. The shell is cut in a direction lengthwise of the shell, preferably in such a way that the cut line intersects the joints between neighboring coils at right-angles, to produce a substantially rectangular sheet.

---

This invention relates to the manufacture of sheet materials such as veneers by joining relatively small sheets of the material together so as to produce sheets of a required size. The invention comprises a mechanical method of joining the component sheets together which greatly facilitates the continuous manufacture of sheets of a desired size.

According to the invention, relatively small pieces of the material in the form of strips are joined together end to end to form a continuous strip which is wound helically on a drum to form a tubular shell from which a relatively large sheet is obtained by cutting in a direction lengthwise of the shell.

Figure 1:
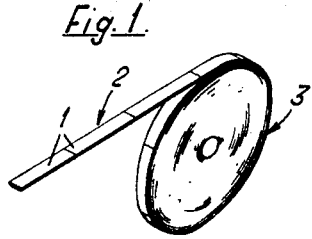
Figure 2:
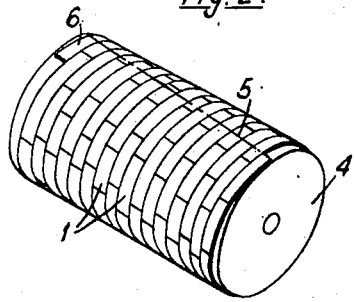
Figure 3:
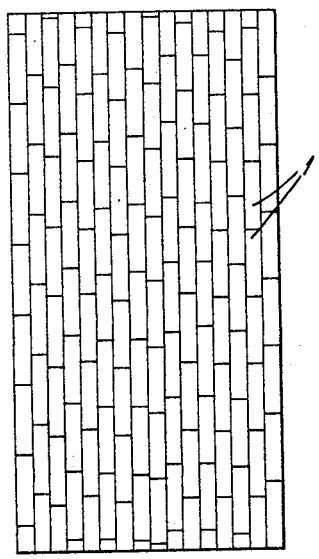

The invention is illustrated in the accompanying drawing in which:

FIGURE 1 is a perspective view showing a continuous strip in the process of being wound into a coil for storage, FIGURE 2 is a perspective view showing strip material wound onto a drum, and FIGURE 3 is a plan view of a finished sheet.

The strips 1 from which the sheet is made may be of various lengths and may have a standard width of, say, two, three or four inches and a standard thickness of say 0.6 mm., 0.9 mm., or 1.3 mm. They may be scarf jointed end to end or stuck to a supporting strip of adhesive paper tape or the like so as to produce a continuous strip 2 of uniform width. The strip is fed through a slitting or other machine which trims it to a uniform width. The strip thus produced may be stored in the form of coils such as that shown at 3 in FIGURE 1 before it reaches the next step in the process of making the sheet.

The next step is to wind the continuous strip 2 helically onto a drum 4 (FIGURE 2) with the coils of the helix laid closely side by side so that there is a neat butt joint between neighbouring coils which runs continuously from end to end of the helix. This produces a tubular shell composed of a number of strips 1 joined together. The joining together of neighbouring coils of the helix may be effected by sticking the strip to an adhesive paper tape or like carrier which may be applied to the surface of the drum either before or after the strip is wound onto the drum.

The length and circumfernece of the drum 4 are chosen according to the size of sheet required so that a single sheet of say eight feet by four feet, seven feet by three feet or ten feet by four feet can be unwrapped from the cylinder after making a single cut along the length of the drum. A "veneer lay on" of standard size can thus be produced. The cut along the length of the drum runs along a curved line 5 (FIGURE 2) intersecting the joints between neighbouring coils of the strip at right angles so as to produce a substantially rectangular sheet. Where either end of the helix projects beyond the end 4, the projecting end 6 (FIGURE 2) is trimmed off.

I claim:
1. A method of making a sheet from relatively small pieces of material in the form of strips which consists in joining the strips together end to end to form a continuous strip, winding the continuous strip helically on a drum joining the helical coils to form a tubular shell and obtaining a relatively large sheet by cutting the tubular shell in a direction lengthwise of the shell.

2. The method as claimed in claim 1 in which the cut along the length of the shell is made along a line which intersects the joints between neighbouring coils of the strip at right angles so as to produce a substantially rectangular sheet.

3. A method of making a sheet from pieces of material in the form of strips which consists in joining the strips together end to end to form a continuous strip, coiling the continuous strip helically onto a single supporting body and thereby forming a hollow shell and cutting the shell lengthwise and thereby forming a plane sheet.

4. The method as claimed in claim 1 in which the strips are joined together by being stuck to a supporting strip of adhesive paper tape, and the helical coils are joined together by being stuck to an adhesive paper tape.

References Cited
UNITED STATES PATENTS

| | | | |
|---|---|---|---|
| 2,379,258 | 6/1945 | Smith | 156—304 XR |
| 3,157,545 | 11/1964 | Waldron et al. | 156—193 XR |
| 1,457,625 | 6/1923 | Freyberg | 156—193 XR |
| 1,436,023 | 11/1922 | Elmendorf | 156—544 |
| 2,770,080 | 11/1956 | Hoyt | 156—258 XR |

PHILIP DIER, Primary Examiner.

U.S. Cl. X.R.
144—309; 156—195, 256, 304; 161—38